(12) United States Patent
Coleman

(10) Patent No.: US 9,440,856 B2
(45) Date of Patent: Sep. 13, 2016

(54) PROCESS FOR PRODUCING GRAPHENE

(75) Inventor: Karl Coleman, Old Elvet (GB)

(73) Assignee: Applied Graphene Materials UK Limited, Newcastle (GB)

( * ) Notice: Subject to any disclaimer, the term of this patent is extended or adjusted under 35 U.S.C. 154(b) by 0 days.

(21) Appl. No.: 14/125,196

(22) PCT Filed: Jun. 13, 2012

(86) PCT No.: PCT/GB2012/051347
§ 371 (c)(1),
(2), (4) Date: Dec. 10, 2013

(87) PCT Pub. No.: WO2012/172338
PCT Pub. Date: Dec. 20, 2012

(65) Prior Publication Data
US 2014/0140917 A1    May 22, 2014

(30) Foreign Application Priority Data
Jun. 14, 2011 (GB) .................................. 1109962.9

(51) Int. Cl.
C01B 31/04    (2006.01)
B82Y 30/00    (2011.01)
B82Y 40/00    (2011.01)

(52) U.S. Cl.
CPC ............ *C01B 31/0446* (2013.01); *B82Y 30/00* (2013.01); *B82Y 40/00* (2013.01); *C01B 31/0453* (2013.01)

(58) Field of Classification Search
CPC .......... C01B 31/0453; C01B 31/0046; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; B82Y 40/00; B82Y 30/00
USPC .......................................................... 423/448
See application file for complete search history.

(56) References Cited

U.S. PATENT DOCUMENTS

| | | | | |
|---|---|---|---|---|
| 3,196,032 A | * | 7/1965 | Seymour | G03G 9/0825 101/DIG. 37 |
| 5,123,961 A | * | 6/1992 | Yamamoto | C09D 11/34 106/272 |
| 2009/0155161 A1 | | 6/2009 | Yoon et al. | |
| 2009/0155561 A1 | * | 6/2009 | Choi et al. | 428/220 |

OTHER PUBLICATIONS

Wang, et al., Large-Scale Synthesis of Few-Layered Graphene using CVD, Chem. Vap. Deposition 2009; 15: 53-56.*
Ma, et al., Self-Assembled Nanofilm of Monodisperse Cobalt Hydroxide Hexagonal Platelets: Topotactic Conversion into Oxide and Resistive Switching, Chem. Mater. 2010; 22: 6341-6346.*
(Continued)

*Primary Examiner* — Daniel C McCracken
(74) *Attorney, Agent, or Firm* — Quarles & Brady LLP

(57) ABSTRACT

A process for producing graphene by providing a plurality of metallic particles as templates for graphene formation and providing a carbon source; reacting the metallic particles and carbon source under conditions suitable for graphene formation; and forming graphene particles on the metallic particles. The graphene particles formed on the metallic particles are of a size and shape substantially corresponding to the size and shape of the metallic particles.

20 Claims, 6 Drawing Sheets

(56) References Cited

OTHER PUBLICATIONS

"Company History," accessed online at http://www.appliedgraphenematerials.com/about-us/company-history/ on Feb. 19, 2016.*

"Board of Directors," accessed online at http://www.appliedgraphenematerials.com/about-us/board-directors/ on Feb. 19, 2016.*

"Major Shareholders," accessed online at http://www.appliedgraphenematerials.com/investor-relations/major-shareholders/ on Feb. 19, 2016.*

Archive of "Company History," dated Sep. 10, 2015, accessed online at https://web.archive.org/web/20150910012220/http://www.appliedgraphenematerials.com/about-us/company-history/ on Feb. 19, 2016.*

Archive of "Board of Directors," dated Sep. 10, 2015, accessed online at https://web.archive.org/web/20150910012315/http://www.appliedgraphenematerials.com/about-us/board-directors/ on Feb. 19, 2016.*

Archive of "Major Shareholders," dated Sep. 10, 2015, accessed online at https://web.archive.org/web/20150910012726/http://www.appliedgraphenematerials.com/investor-relations/major-shareholders/ on Feb. 19, 2016.*

Cobalt(II) nitrate hexahydrate, accessed online at http://www.sigmaaldrich.com/catalog/product/aldrich/203106?lang=en&region=US on Mar. 21, 2016.*

Brownson, et al., An Overview of Graphene in Energy Production and Storage Applications, Journal of Power Sources, 2011, 196:4873-4885.

Chen, et al., Bulk Growth of Mono- to Few-Layer Graphene on Nickel Particles by Chemical Vapor Deposition from Methane, Carbon, 2010, 48:3543-3550.

Dervishi, et al., Versatile Catalytic System for the Large-Scale and Controlled Synthesis of Single-Wall, Double-Wall, Multi-Wall, and Graphene Carbon Nanostructures, Chem. Mater., 2009, 21:5491-5498.

Li, et al., Large-Area Synthesis of High-Quality and Uniform Graphene Films on Copper Foils, Science, 2009, 324:1312-1314.

Radoi, et al., Graphene Ink Photodetector for UV-VIS and NIR Domain, Semiconductor Conference (CAS), 2010 International, IEEE, Oct. 11, 2010, pp. 73-76.

Wei, et al., Scalable Synthesis of Few-Layer Graphene Ribbons with Controlled Morphologies by a Template Method and Their Applications in Nanoelectromechanical Switches, J. Am. Chem. Soc., 2009, 131:11147-11154.

PCT International Search Report, PCT/GB2012/051347, Oct. 18, 2012, 5 pages.

* cited by examiner a,b) SEM images (scale bars 2µm and 500nm respectively) (c) BF TEM image with inset SAED and (d) EDX analysis of cobalt hydroxide nanoplatelets.

(a,b) Secondary electron image (scale bars 1μm and 500 nm respectively) platelet at a stage in between synthesis and purification.

XRD (Cu K$_\alpha$ X-ray source, $\lambda$ = 1.54nm) spectrum of (left) $\alpha$ - Co(OH)$_2$ nanoplatelets and (right) copper nanobelts Figure 5 – Raman spectrum (532 nm) of graphene grown on Co nanoplatelets (lower) and Cu nanobelts (upper)

Figure 6– C1s XPS spectrum of carbon product from cobalt nanoplatelets
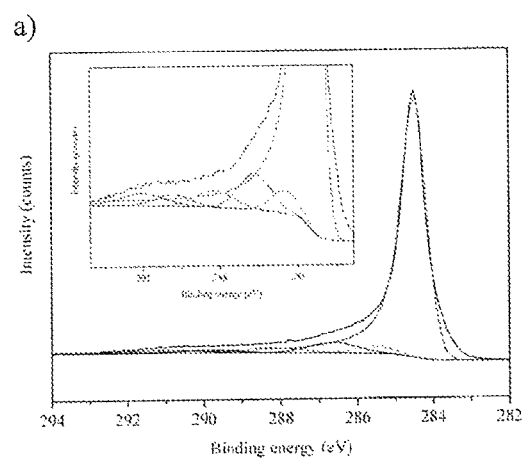
Figure 7 – (a,b) BF TEM images of copper nanobelt templates (c) BF TEM images of agglomerated nanobelts, (d) HREM of individual graphene nanobelt
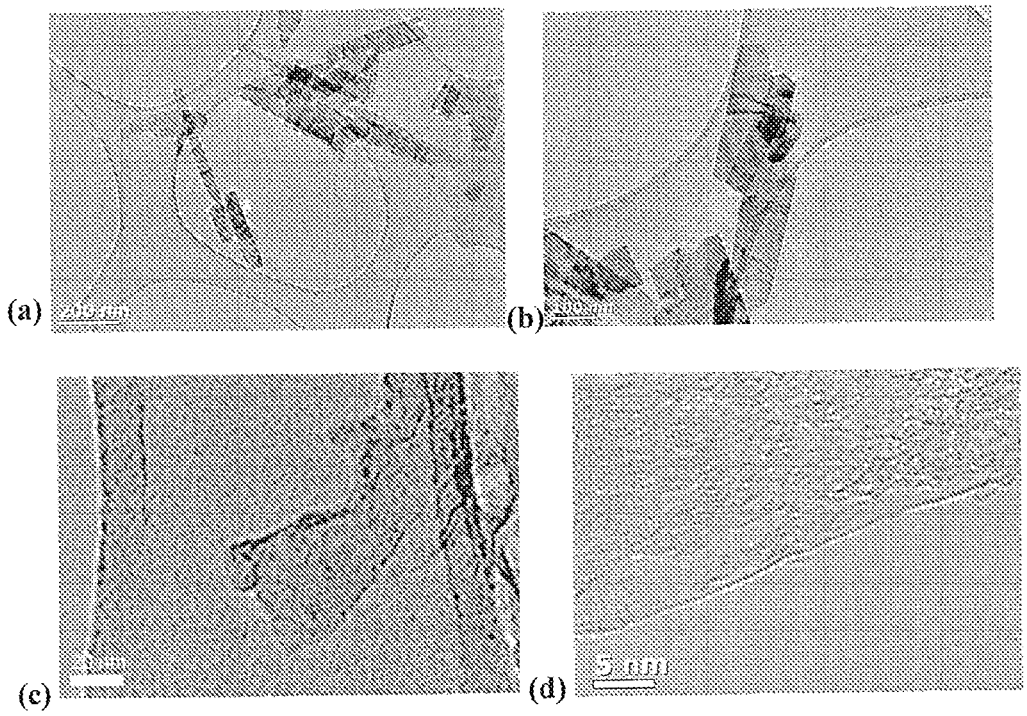

Figure 8 – C1s XPS spectrum of carbon product from (a) cobalt nanoplatelets and (b) copper nanobelts
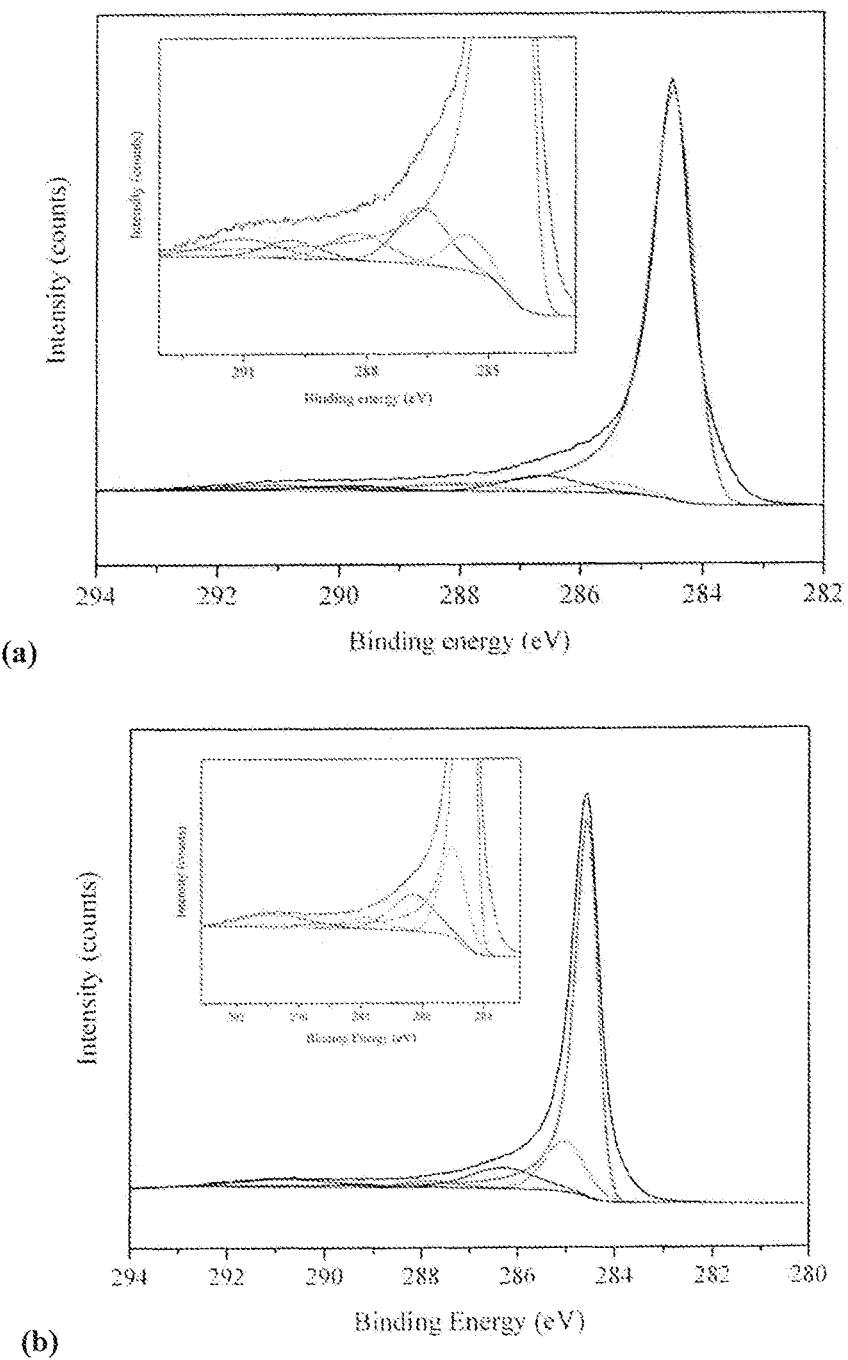

PROCESS FOR PRODUCING GRAPHENE

CROSS-REFERENCE TO RELATED APPLICATIONS

This application represents the national stage entry of PCT International Application No. PCT/GB2012/051347 filed on Jun. 13, 2012, and claims the benefit of Great Britain Patent Application No. 1109962.9 filed Jun. 14, 2011. The contents of both of these applications are hereby incorporated by reference as if set forth in their entirety herein.

FIELD OF THE INVENTION

The present invention relates to a process for producing graphene.

In particular, the invention relates to a process for producing graphene by synthesis on a plurality of metallic particles.

BACKGROUND TO THE INVENTION

Graphene is becoming an ever popular material to materials scientists for use in a wide range of applications. Its structure gives rise to some interesting electronic and mechanical properties that have propelled it to the forefront of its field.

Graphene is a monolayer or single sheet of graphite and is the newest member of the nanocarbon family, which includes carbon nanotubes and fullerenes. The two-dimensional single-layered continuous network of hexagonally arranged carbon atoms gives rise to some interesting electronic properties; in particular the relativistic behaviour of the conduction electrons, termed Dirac fermions, which travel at speeds only 300 times less than the speed of light.

Graphene has also been shown to exhibit a room temperature quantum Hall effect and an ambipolar field effect, with high carrier mobility (approaching 200,000 $cm^2V^{-1}s^{-1}$), where the charge carriers can be tuned between electrons and holes. Aside from the obvious interest in the unique electronic properties, graphene has exceptional strength with mechanical properties rivalling that of carbon nanotubes with a Young's modulus of 1 TPa.

The thermal conductivity of graphene is also comparable to carbon nanotubes with values up to 5300 $Wm^{-1}K^{-1}$ recorded. Owing to these exceptional properties graphene has applications in new generation electronic components energy-storage materials such as capacitors and batteries, polymer nanocomposites, optically transparent thin films, printable inks and mechanical resonators.

Problems arise due to the scalability of most existing graphene synthesis methods.

Methods exist to produce high quality continuous films of material that are suitable for some electronics applications. However, in fields such as composite science; the fabrication of large area films for transparent electrode applications; capacitors; and inks, much larger quantities are required.

Graphene has been made by a number of methods including micromechanical cleavage, sublimation of silicon from SiC in ultra high vacuum, chemical vapour deposition (CVD) growth on metal foils, liquid exfoliation of graphite and graphite oxidation to graphene oxide followed by reduction.

The problem with making graphene is that existing methods are useful for single flake studies and for relatively large area continuous films, but methods for preparing it in scalable quantities is very difficult. Samples prepared by graphite oxidation and reduction have become available—but are difficult to scale and the reduction step only partially restores the pristine graphitic structure, so the resulting material does not possess the excellent mechanical and electrical properties associated with graphene.

The growth mechanism for CNTs involves the catalytic decomposition of the carbon precursor molecules on the surface of the metal catalyst particles, followed by diffusion of the released carbon atoms into the metal particles. Carbon saturation in the metal occurs by reaching the carbon solubility limit whereby a carbon envelope is created and grows with continued carbon precipitation forming tube structures.

CNTs have been synthesised by growing graphitic carbon around nickel nanowire templates, and spherical nanoparticles have been used to template the growth of carbon nanotubes using catalytic vapour deposition.

Few layer graphene nanoribbons (4.5-7.5 nm thickness) have also been grown by CVD of methane/hydrogen mixtures on ZnS nanoribbons on silicon substrates. Wei et al J. Am. Chem. Soc. 2009, 131, 11147 describes a method of producing graphene ribbons for use in electronics applications, using zinc sulphide ribbons on silicon substrates as templates for graphene growth, produced by chemical vapour deposition.

In this method, the silicon substrate is needed to grow the zinc sulphide ribbons in situ. This makes the method very difficult to scale as it is limited by the area of the silicon substrate. Also, the method requires a step of mechanically removing graphene from the substrate, by scratching it from the silicon.

It is known to grow large area graphene on copper foil sheets to produce a continuous layer of graphene in the form of a large sheet for use in electronic devices. However, this process is very expensive and is therefore undesirable for large scale production.

In methods utilising metal foils, the amount of graphene produced is similarly limited by the area of the starting substrate/foil.

Additionally, chemical vapour deposition on foils has limited application where a continuous film is required.

It would be desirable to provide an improved process for producing graphene.

SUMMARY OF THE INVENTION

One aspect of the invention provides a process as claimed in Claim 1.

In this document the term "metallic particles" is not limited to particles consisting exclusively of one or more metals. Thus, the term "metallic particles" may comprise non-metallic elements and may for example, comprise compounds such as metal oxides.

One aspect of the invention provides a process for producing graphene comprising the steps of:

providing a plurality of metallic particles as templates for graphene formation;

providing a carbon source;

reacting the metallic particles and carbon source under conditions suitable for graphene formation; and forming graphene particles on the metallic particles, wherein the graphene particles formed on the metallic particles are of a size and shape substantially corresponding to the size and shape of the metallic particles.

This provides the advantage that the growth and size of the graphene particles can be carefully controlled and the resulting particles are of a size that allows improved dispersion in, for example, a composite material or film.

Preferably, the carbon source and metallic particles or precursor thereof are fed into a reactor.

In one embodiment, the metallic particles or precursor thereof are fed into the reactor substantially simultaneously with the carbon source.

Advantageously, the process is a substantially continuous process.

Advantageously, the metallic particles are of a size, shape and/or aspect ratio suitable for introduction to the reactor in a dispersion, solvent, vapour, aerosol, or spray.

Advantageously, the size, shape and/or aspect ratio of the metallic particles is predetermined. Thus, the dimensions of the resulting graphene particles can be controlled.

Preferably, the metallic particles are fed into the reactor in a dispersion, solvent, vapour, aerosol, or spray.

In one embodiment, the metallic particles may be introduced into the reactor as a fluidized bed.

In a preferred embodiment, the graphene particles are removed substantially continuously from the reactor.

Preferably, the graphene particles are formed by chemical vapour deposition.

The graphene particles may be formed in a single layer or multiple layers.

Advantageously, the thickness of graphene formed on the metallic particles is controlled by adjusting flow rate and/or reaction/removal time.

Preferably, the metallic particles each comprise at least one substantially flat surface on which the graphene particles form.

This provides the advantage that the graphene formed has a sheet-like morphology.

The particles may be in the form of platelets, nanoplatelets, belts, nanobelts or cubes.

In one embodiment, the particles may be in the form of shapes other than platelets, nanoplatelets, belts, nanobelts or cubes, such as polygons or rhombohedrons.

In one embodiment, the metallic particles have an aspect ratio of around 1:10 or lower.

The metallic particles may comprise belts/nanobelts having a lateral dimension of about 50 nm by 500 nm and a thickness of about 40-50 nm.

In a preferred embodiment, the metallic particles have an aspect ratio of around 1:1.

The metallic particles may comprise platelets/nanoplatelets having a lateral dimension of about 1-2 µm and a thickness of about 40-50 nm.

Small particles provide a large surface area for graphene formation.

The size and shape/aspect ratios provide templates for graphene synthesis which form graphene having sheet-like morphology and which does not show a tendency to roll into nanotubes or nanoscrolls.

Preferably, the metallic particles comprise a transition metal or compound thereof.

This provides the advantage that the transition metal particle acts as both template and catalyst for graphene formation.

In a preferred embodiment, the transition metal is selected from the group of nickel, iron, cobalt, copper, platinum, iridium, ruthenium and gold.

The metallic particles may comprise cobalt hydroxide.

In one embodiment, the metallic particles are dispersed in a support.

Preferably, the metallic particles are randomly dispersed in the support.

This prevents them from clumping together, while exposing faces of the metallic particles to a carbon feedstock.

A wet impregnation method may be used to disperse the particles in the support.

Wet impregnation is simple to perform and the particles in support generally have at least one face exposed to the carbon feedstock. More than one flat face of some particles may be at least partially exposed.

The support may comprise magnesium oxide, silicon, aluminium oxide, silicon oxide, aluminosilicates, zeolites, MCM-41 or MC-8.

The support is preferably substantially inert and able to withstand high temperatures. The support acts as a matrix.

The metallic particles may be present in the support at about 1-10 wt %.

In one embodiment, the support is formed from a precursor.

The precursor may be fed into the reactor substantially simultaneously with the metallic particles, such that the support forms in the reactor.

Advantageously, the graphene is removed from the support and/or metallic particles by a single dissolution step.

The method may further comprise the step of connecting the graphene particles to form a film.

This is significantly less expensive than forming films on large foils. Also, since all particles forming the film are of a substantially corresponding size and shape, conductivity through the film is uniform.

Another aspect of the invention provides graphene particles formed by the process of the invention.

The particles formed are advantageously all graphene particles of a corresponding size and shape (to the metallic template used in the process).

Another aspect of the invention provides a film comprising a plurality of graphene particles.

Preferably, the graphene particles are of substantially similar size and shape.

Yet another aspect of the invention provides a film comprising a plurality of graphene particles of substantially similar size and shape.

Such a film has comparable conductivity to continuous graphene films.

Advantageously, the graphene particles may be for use in a capacitor or ink.

Another aspect of the invention provides an ink comprising a plurality of graphene particles.

Another aspect of the invention provides a capacitor comprising a plurality of graphene particles.

Yet another aspect of the invention provides composite material comprising graphene formed by the process of the invention.

Since a large quantity of graphene may be required in composite materials, graphene produced by an inexpensive method is desirable in such products. The size and regular shapes of the particles provides improved dispersion in composites.

Yet another aspect of the invention provides the use of metallic particles having an aspect ratio of around 1:10 or lower for templated synthesis of graphene.

The use of metallic particles provides surfaces for graphene to form in shapes/sizes corresponding to the particles, such that graphene particles of a predetermined size/shape/aspect ratio are formed. Thus, the process can be easily controlled and continuous.

Another aspect of the invention provides a support comprising a plurality of metallic particles for use in the process of the invention.

BRIEF DESCRIPTION OF THE DRAWINGS

FIG. 5 shows a Raman spectrum (532 nm) of graphene grown on Co nanoplatelets (lower) and Cu nanobelts (upper).

FIG. 6 shows a C1s XPS spectrum of carbon product from cobalt nanoplatelets.

FIG. 7 shows (a, b) BF TEM images of copper nanobelt templates (c) BF TEM images of agglomerated nanobelts, (d) HREM of individual graphene nanobelt.

FIG. 8 shows C1s XPS spectrum of carbon product from (a) cobalt nanoplatelets and (b) copper nanobelts.

DETAILED DESCRIPTION OF THE PREFERRED EMBODIMENTS

The metallic particles used in the invention are preferably transition metal particles having at least one substantially flat surface.

These structures have length x and width y, where the aspect ration of x to y is 1:10 or less. In one embodiment, metallic platelets are used in the invention, the dimensions of x and y being approximately equal ie an aspect ratio of around 1:1.

In another embodiment, metallic nanobelts are used in the invention, the nanobelts having dimensions of around 50 nm by 500 nm, giving an aspect ratio of typically around 1:10.

Figure 3:
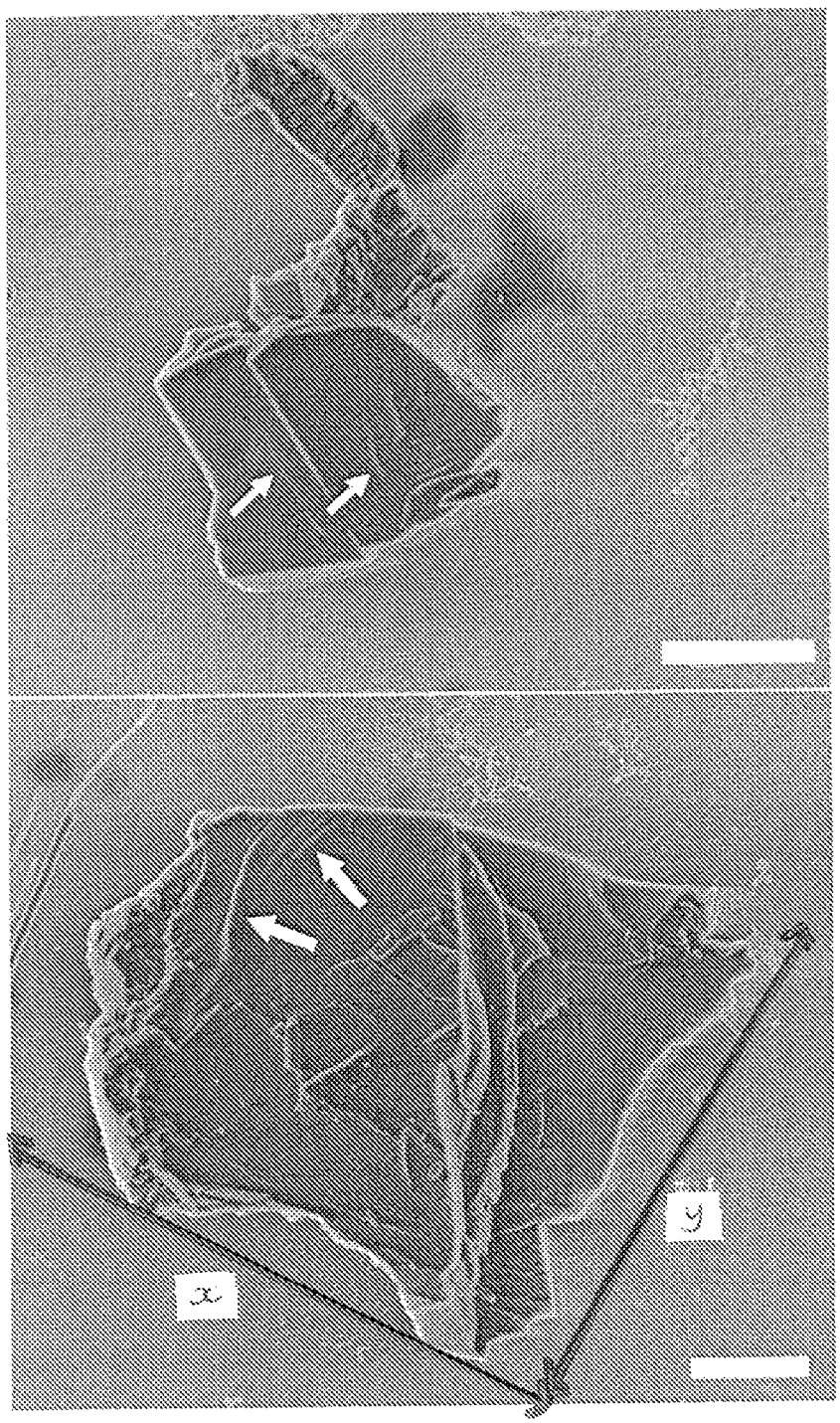
FIG. 3 shows secondary electron image (scale bars 1 μm and 500 nm respectively) platelet at a stage in between synthesis and purification.
Figure 4:
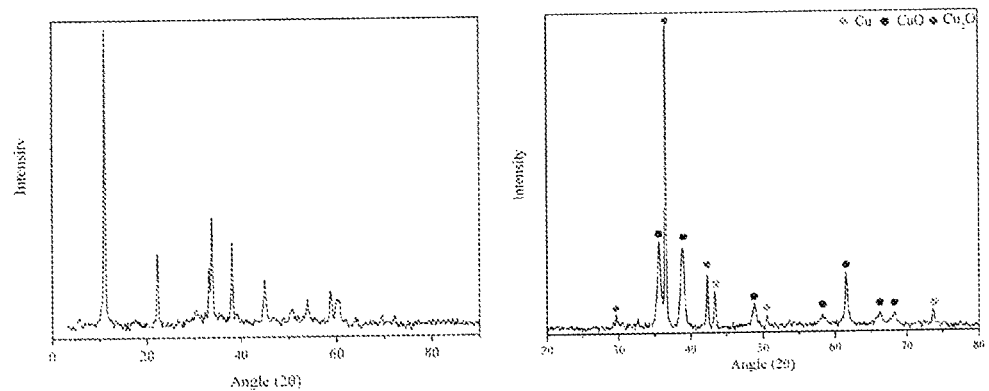
FIG. 4 shows XRD (Cu $K_\alpha$ X-ray source, $\lambda=1.54$ nm) spectrum of (left) α-Co(OH)$_2$ nanoplatelets and (right) copper nanobelts
Figure 4:
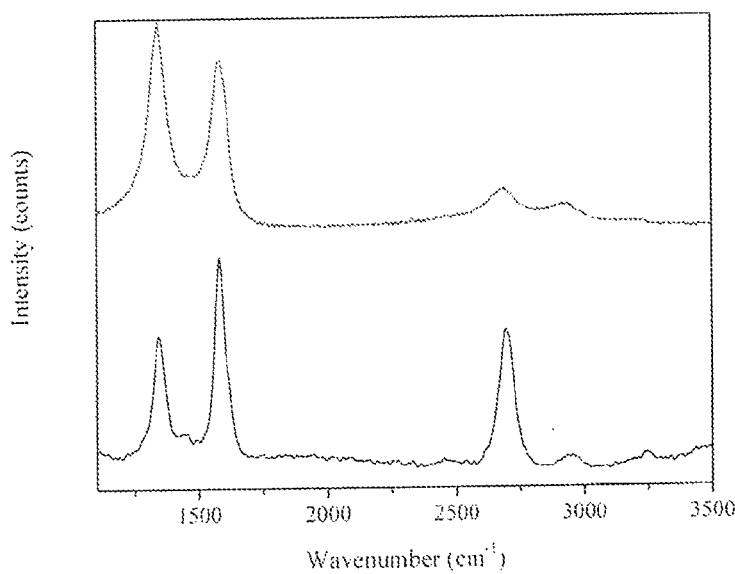

An example of the use of platelets is illustrated in FIG. 3, in which the length x and width y dimensions of the particle are indicated. In a preferred embodiment, the thickness z of the metallic particles is substantially smaller than x and/or y and at least one of x, y and/or z is in the order of nanometers. In the examples that follow, the metallic platelets used in the method were in the region of 1-2 μm in length/width (x/y) and 40-50 nm thick (z).

In a preferred embodiment, the metallic particles may be of a size or aspect ratio suitable for use in the CVD process described. In particular, they may be of a size suitable for introduction to the reactor in a gas, vapour, aerosol or spray. Large particles and particles having high aspect ratios would not be suitable for efficiently spraying into a reactor.

In another embodiment the catalyst (metallic particles) may be introduced into the hot zone a as a fluidized bed, where the catalyst or catalyst support is a solid in the hot zone or added to the hot zone.

Figure 1:
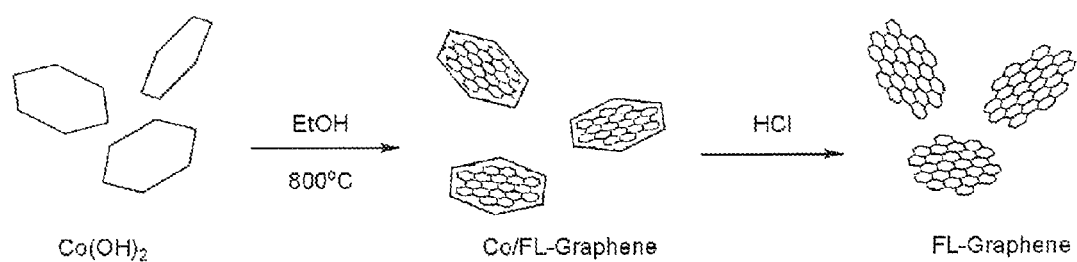
FIG. 1 is a schematic representation of one embodiment of the method of the invention.

As illustrated in FIG. 1, the method of the invention involves synthesis of graphene using metallic particles as templates for growth and using CVD.

In a preferred embodiment, graphene is synthesised using magnesium oxide supports doped with cobalt hydroxide platelet particles.

Metallic particles useful in the invention include transition metal particles. Transition metals are known to catalyse growth of graphene in chemical vapour deposition techniques.

Transition metals, or compounds thereof, particularly suitable for use in the invention are nickel, iron, cobalt, copper, platinum, iridium, ruthenium and gold. These metals are useful for growing carbon nanotubes or graphene, due to their ability to form weak carbides and/or the solubility of carbon in the metal at high temperatures.

In the examples that follow, the transition metals cobalt and copper were used for producing the particles, (in the case of cobalt, cobalt hydroxide is used).

Method

As a first step, transition metal particles (referred to herein as platelets or belts—depending on the aspect ratio) were formed for use in the method, as outlined below:

Synthesis of Cobalt Hydroxide Platelets

CoCl$_2$.6H$_2$O (Alfa Aesar, 0.4 g, 10 mM), NaCl (Alfa Aesar, g, 50 mM) and HMT (Alfa Aesar, 1.686 g, 60 mM) dissolved in H$_2$O:EtOH (200 ml, 9:1) and heated to 90° C. for 1 h. The green precipitate was filtered from its parent solution, centrifuged (3000 rpm, 10 mins) with water several times, then ethanol and finally dried overnight in vacuum oven at 100° C.

The method of forming the cobalt hydroxide nanoplatelets via precipitation from water ethanol solution using hexamethylenetetramine (HMT) and sodium chloride is illustrated below:

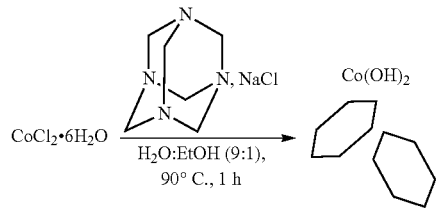

The nature of the Co(OH)$_2$ platelets formed is shown in FIG. 1, which shows XRD spectrum of from the XRD (Cu $K_\alpha$ X-ray source, $\lambda=1.54$ nm) spectrum of (left) α-Co(OH)$_2$ nanoplatelets and (right) copper nanoplatelets. XRD as the chloride intercalated a form showing the prominent 003 and 006 reflections at 7.95 Å and 3.98 Å.

Figure 2:
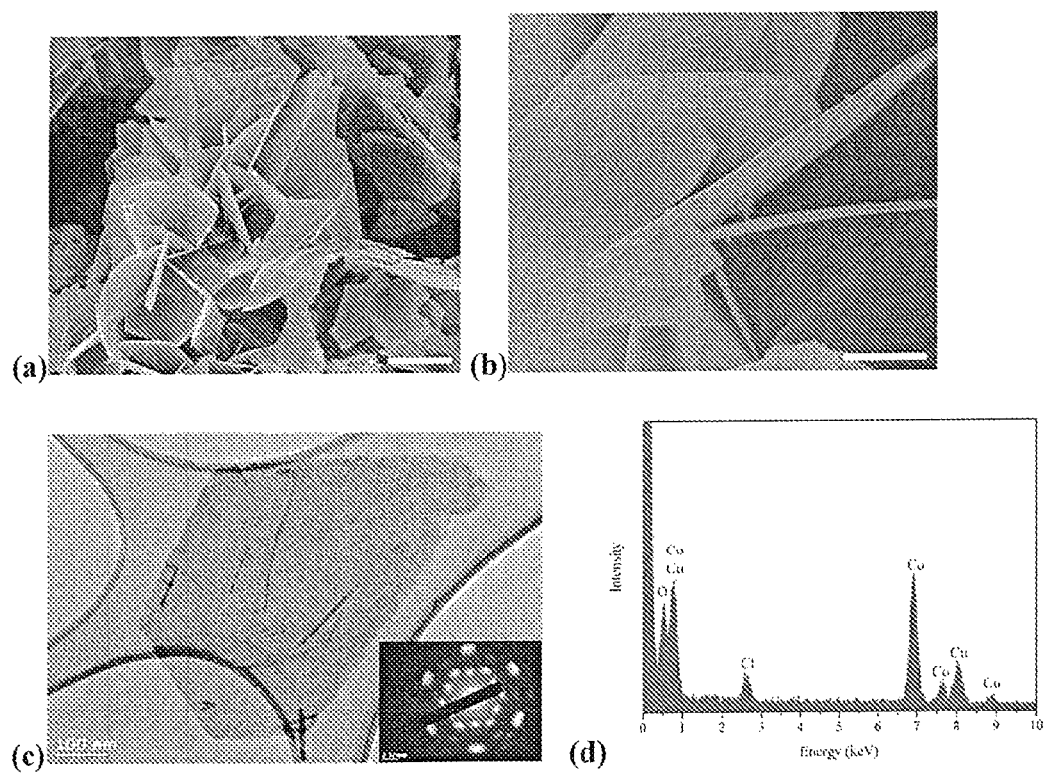
FIG. 2 shows (a,b) SEM images (scale bars 2 μm and 500 nm respectively) (c) BF TEM image with inset SAED and (d) EDX analysis of cobalt hydroxide nanoplatelets.

The lateral dimension and thickness of these platelets was measured to be in the region of 1-2 μm and 40-50 nm respectively, measured by SEM (FIG. 2).

By utilising the platelets formed by the above method in the method of the invention, graphene growth occurs on substantially flat surfaces of the platelets to give sheet-like morphology.

Example 1

Synthesis of Graphene Using Co(OH)$_2$ Platelets and MgO Support

A schematic representation of the synthesis of graphene by the method of the invention is illustrated in FIG. 1.

The MgO supported catalyst was prepared using wet impregnation in ethanol with 1-10 wt % of platelet catalyst used. Typically, wet impregnation of magnesium oxide support was conducted by sonicating Co(OH)$_2$ platelets (46 mg, mmol) in 40 ml ethanol until dispersed whereby MgO (Aldrich, 2 g, mmol) was added and the mixture sonicated for 1 h.

Ethanol was then removed under reduced pressure and the catalyst dried overnight at 120° C.

For the CVD growth of the graphene, the catalyst was placed in a combustion boat (recrystallized alumina, Aldrich) heated to 800° C. under Argon flow (60 ml min$^{-1}$). Ethanol was flowed into the furnace at 1 ml min$^{-1}$ using a nebulizer spray bottle and an argon flow rate of 180 ml min$^{-1}$ and flowed for 30 mins. Upon completion the furnace was allowed to cool to room temperature under an argon flow.

The MgO support and platelet catalyst were removed by dissolving in 6M HCl.

The graphene product was isolated by filtration, washed with water until pH neutral and dried in vacuum oven overnight at 100° C.

Alternatively the ethanol can be replaced with a mixture of hydrogen (10%) in methane at a flow rate of 200 ml min$^{-1}$.

Example 2

Synthesis of Graphene Using Co(OH)$_2$ Platelets and Silicon Support

In another embodiment, silicon substrates were used as the support/matrix in the method of the invention. Cobalt hydroxide nanoplatelets were used as a template/catalyst for graphene synthesis.

Silicon substrates were cleaned using the standard RCA procedure and were spin coated using an ethanol solution of the cobalt hydroxide platelets (50 μgml$^{-1}$). Samples were inserted into a quartz reactor tube furnace fitted with a liquid nebulizer. Samples were heated to 800° C. at 20° C./min under 60 ml/min argon flow.

At temperature, argon flow was increased to 180 ml/min so introducing ethanol to the tube furnace at a rate in the region of 1 ml/min. Flow was continued for 2 minutes and turned back to 60 ml/min while cooling to room temperature.

The cobalt in the samples was removed via sonication in dilute HCl, removing the graphene samples from the surface of the silicon substrate and deposited for TEM imaging.

In Examples 1 and 2, the purification/isolation step is a single step in which the metal particle and supporting matrix (if present) are dissolved in an appropriate acid or base, allowing isolation of graphene.

The cobalt hydroxide platelets/belts provide a flat surface for graphene formation. In this way, the use of metallic particles in a silicon matrix can produce many platelets of graphene as opposed to large area films. Further, the carbon absorbed at high temperature is structured into graphitic sheets.

Studying the resulting graphene particles by SEM after synthesis shows the particles to remain in the plate morphology even after the reduction and carbon formation steps (FIG. 2).

The surfaces of the platelets are very smooth and the observation of ripples on the surface of some graphene particles surprisingly resembled those observed for graphene structures on metal foils after CVD synthesis, due to the difference in the thermal expansion co-efficient.

FIG. 3 shows an SEM image of a nanoplatelet at a stage in between synthesis and purification. The arrows indicate areas where surface rippling has occurred similar to that seen in graphene grown on metal foils, confirming that graphene is present on platelet surfaces.

As shown in FIG. 3, the length x and width y of the platelet are approximately equal (1-2 μm).

Graphene synthesised by this method can be few layers or single layer.

Ethanol is used in the example described above, but any alcohol or other carbon feedstock can be used in the method. Where a hydrocarbon (eg methane) is used as the carbon feedstock, hydrogen gas is also introduced, typically in the ratio 10% hydrogen to 90% methane. Ethanol vapour spray, carbon monoxide or other carbon-containing gases may also be used in the method. The addition of some moisture or water to the gases can help to control carbon/graphene growth.

Example 3

Hydrothermal Synthesis of Copper Nanobelts and Synthesis of Graphene Using the Same CuCl$_2$.2H$_2$O (Sigma Aldrich, 0.2557 g, 15 mmol), SDS (Sigma Aldrich, 0.1297 g, 0.45 mmol), NaOH (Fisher Scientific, 3.6 g, 90 mmol) added to deionised water so to make a 30 ml solution of 50 mM, 15 mM and 3M respectively. NaH$_2$PO$_3$ (Alfa Aesar, 1.272 g, 12 mmol, 0.4M) was added and vigorously stirred for 30 mins. Solution was placed in glass lined stainless steel autoclave and maintained at 100° C. for 12 hours. The red precipitate was removed from bottom and centrifuged in water multiple times and finally ethanol and dried under vacuum at 60° C.

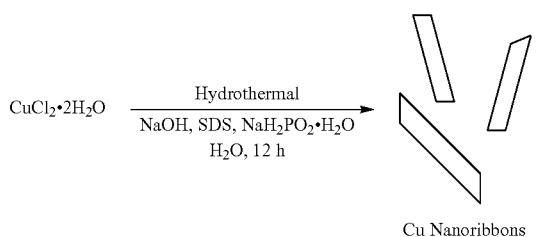

$$CuCl_2 \cdot 2H_2O \xrightarrow[H_2O, 12\ h]{\text{Hydrothermal} \atop NaOH,\ SDS,\ NaH_2PO_2 \cdot H_2O}$$

Cu Nanoribbons

The dimensions of these copper nanobelts, as measured from TEM images, showed lengths x of a few hundred nanobelts, widths y of 80-100 nm and uniform thickness of 18-20 nm.

The same CVD method was performed using the copper nanobelts in place of the cobalt platelets to produce graphene particles having predetermined dimensions.

The resulting graphene nanobelt edges showed the graphene to be single layer in nature, confirmed by height measurements for Tappingmode™ AFM results. The method of the invention provides a method for the synthesis of few layer or single layer graphene using templated CVD growth based on multiple metallic structured particles. By templating growth on the particles, it is possible to create defined shapes for the graphene by predetermining the shape of the platelet/belt particle structures.

Support/Matrix

A substantially inert matrix such as magnesium oxide or silicon may be used in the method of the invention.

Alternative substrates suitable for a matrix could be aluminium oxide, silicon oxide, aluminosilicates, zeolites, molecular sieves and mesoporous material such as MCM-41 and MC-8.

The nanoplatelets are added to the substrate by wet impregnation, a technique which is well known to the skilled person.

In the present case, the method involves making a dispersion of the platelets in a suitable solvent, making a slurry with the chosen substrate/support, mixing this slurry and then finally removing the solvent and drying the powder.

The platelets are loosely associated with and dispersed in the matrix/substrate, which keeps the platelets apart and prevents them from clumping/sintering together (which may otherwise lower the surface area of the platelets and make the process less efficient).

The substrate acts as a matrix to dilute the particles, so that surfaces of platelets are exposed to the carbon-containing feedstock in the synthesis step, enabling graphene production. The platelets are randomly orientated in the substrate/matrix, and generally at least one face of each platelet is available for growth of graphene.

Typically, the platelets are present in the substrate at between about 1-10 wt %.

An advantage of the present method is that it is possible to obtain large amounts of graphene by providing a high number of platelets in the substrate, which can be continuously fed into a furnace to produce graphene in a continuous process.

In one embodiment, the matrix/support can be made in situ in a reactor by providing a precursor.

The relevant molecular precursor is provided in a solvent with the metallic template particles and a hydrolysis step results in formation of the matrix/support from the precursor. For example, $Si(OR)_4$ to $SiO_2$ or $Mg(OR)_2$ to MgO (where R=alkyl group).

In one embodiment, the template particles are introduced into the reactor without any matrix/support. They may be introduced to the reactor as a dispersion in a solvent or in an aerosol/spray. The template particles may be sprayed into the reactor as a metal alkoxide in a solvent such as ethanol.

The rate of production/thickness of graphene may be controlled by controlling the time/flow rate of the gas/carbon feedstock through the apparatus.

Since the template particles and the carbon feedstock can be continuously fed into the reactor, the process can be a continuous process in which graphene is continuously removed. Graphene may be removed from a hot zone of a reactor by flowing gases, gravity or rotating device.

The metallic particles act as both template and catalyst in the method and as such, the size distribution of the graphene synthesised will closely match that of the catalyst (ie the metallic template).

The dimensions of the graphene product obtained by the method may be carefully controlled as the structural dimensions are dictated by metallic particle size. The thickness of the graphene grown on the platelets can be controlled by flow rate/time.

The present method provides an inexpensive method for graphene production. It produces a high yield of graphene compared with known methods, and can be implemented as a continuous process. It is also scalable for industrial-scale production of graphene and has particular application in graphene for composite materials.

As illustrated in FIG. 1, the graphene particles (or graphene platelets) obtained are of a size and shape corresponding to the platelets on which the graphene grows. These small graphene particles can be assembled as a film by at least partially joining edges or overlapping of graphene nanoplatelets.

Large continuous graphene films, such as those produced on large copper and nickel foils, are extremely expensive to make. A film constructed from graphene nanoplatelets or nanobelts made in the present method will be significantly less expensive.

Furthermore, a film comprising the graphene particles will have regular particle size throughout the film, which gives reliable and uniform conductivity.

Similarly, the shape and size/aspect ratio of the graphene particles in composites provide composite materials having improved dispersion of graphene particles. Controlled particles size also improves dispersions for inks and is important in maintaining uniform performance in capacitors.

Characterization Details (Analysis)

Transmission electron microscopy (TEM), scanning electron microscopy (SEM), atomic force microscopy (AFM), Raman spectroscopy, X-ray photoelectron spectroscopy (XPS), X-ray powder diffraction and thermo gravimetric analysis (TGA), have been employed to characterize the material.

TEM

Bright-field TEM images were taken using a JEOL 2100F 200 kV FEG-TEM operated at 80 kV. Samples were prepared by dispersing the material in ethanol and pipetting a few drops onto a lacey carbon film supported by a copper grid (400 mesh). Electron Energy Loss Spectroscopy (EELS) was performed using a Tridiem Gatan Imaging Filter, with a 2k×2k CCD camera.

SEM

SEM images were taken using a FEI FIB-SEM operated at 1-5 kV using secondary electron detection. Samples were spin coated from ethanol solution (ca. 0.005 mgml$^{-1}$ produced by sonication in an ultrasonic bath (Ultrawave U50, 30-40 kHz) for 15 mins) onto pre-cleaned silicon surfaces. Cobalt hydroxide imaged samples were imaged with a 6 nm deposition of carbon to prevent charging. Reduced Co/FLG graphene and FL graphene samples on silicon needed no such preparation.

AFM

Samples for AFM analysis were produced by drop deposition onto freshly cleaved mica of the corresponding solution of graphene products (ca. 0.005 mg mL$^{-1}$) in ethanol produced by sonication in an ultrasonic bath (Ultrawave U50, 30-40 kHz) for 15 mins. Samples were dried in air before imaging in TappingMode™ using a Veeco Multimode AFM with a Nanoscope IV controller. Si AFM probes (model: TESP) with a frequency range: 281-348 kHz and spring constant of 20-80 N/m were used.

Raman Spectroscopy

The Raman spectrum (FIG. 7, 532 nm excitation) shows the D, G and G' band associated with carbon products of the CVD procedure.

Studies of the $I_G:I_{G'}$ ratio conducted on graphene produced from nickel foils show values of 0.18, 0.35 and 1.3 for single, double and triple layer graphene respectively. The intensity ratio shown by the few layer graphene on the cobalt nanoplatelets shows a value of 1.4 consistent with these results.

The Raman spectrum for the Co nanoplatelet graphene products show a relatively intense D band.

Films of graphene made by CVD synthesis on cobalt films have previously shown these large relative D:G ratios.

Raman spectra were recorded using a Jobin Yvon Horiba LabRAM spectrometer in a back scattered confocal configuration using frequency doubled Nd:YAG (532 nm, 2.33 eV) laser excitation. All spectra were recorded on solid samples over several regions and were referenced to the silicon line at 520 cm$^{-1}$.

XPS

XPS studies were performed using a Scienta ESCA 300 hemispherical analyser with a base pressure under 3×10$^{-9}$ mbar. The analysis chamber was equipped with a monochromated Al K$_\alpha$ X-ray source (hv=1486.6 eV). Photoelectrons were collected at a 45 degree take-off angle, and the analyser pass energy was set to 150 eV giving an overall energy resolution of 0.4 eV. Samples were prepared by sonication in propan-2-ol and drop dried onto steel stubs for analysis. All quantification and peak deconvolution processing of XPS data was conducted at NCESS using the CasaXPS software.

TGA

Thermogravimetric analysis (TGA) data were recorded on 1-3 mg of sample using a Perkin Elmer Pyris I. Data were recorded in flowing air (20 mL min$^{-1}$) at a ramp rate of 10° C. min$^{-1}$ to 900° C. after being held at 120° C. for 30 mins to remove any residual solvent.

The invention claimed is:

1. A process for producing graphene comprising the steps of:
   providing a plurality of metallic particles as templates for graphene formation;
   providing a carbon source;
   reacting the metallic particles and carbon source under conditions suitable for graphene formation; and
   forming graphene particles on the metallic particles,
   wherein the graphene particles formed on the metallic particles are of a size and shape substantially corresponding to the size and shape of the metallic particles, and
   wherein the metallic particles are dispersed and suspended as spaced-apart solid particles in a wet or dry fluidized support medium so each particle provides a template for graphene production.

2. A process as claimed in claim 1, wherein the carbon source and metallic particles or precursor thereof are fed into a reactor.

3. A process as claimed in claim 2, wherein the process is a substantially continuous process.

4. A process as claimed in claim 1, wherein the metallic particles are fed into the reactor in a dispersion, solvent, vapour, aerosol, or spray.

5. A process as claimed in claim 2, wherein the graphene particles are removed substantially continuously from the reactor.

6. A process as claimed in claim 1, wherein the graphene particles are formed by chemical vapour deposition.

7. A process as claimed in claim 1, wherein the graphene particles are formed in a single layer or multiple layers.

8. A process as claimed in claim 1, wherein the thickness of graphene formed on the metallic particles is controlled by adjusting flow rate and/or reaction time.

9. A process as claimed in claim 1, wherein the metallic particles each comprise at least one substantially flat surface on which the graphene particles form.

10. A process as claimed in claim 1, wherein the metallic particles have an aspect ratio of around 1:10 or lower.

11. A process as claimed in claim 10, wherein the metallic particles comprise belts having a lateral dimension of about 50 nm by 500 nm and a thickness of about 40-50 nm.

12. A process as claimed in claim 10, wherein the metallic particles have an aspect ratio of around 1:1.

13. A process as claimed in claim 12, wherein the metallic particles comprise platelets having a lateral dimension of about 1-2 µm and a thickness of about 40-50 nm.

14. A process as claimed in claim 1, wherein the metallic particles comprise a transition metal or compound thereof.

15. A process as claimed in claim 14, wherein the transition metal is selected from the group of nickel, iron, cobalt, copper, platinum, iridium, ruthenium and gold.

16. A process as claimed in claim 15, wherein the metallic particles comprise cobalt hydroxide.

17. A process as claimed in claim 1, wherein the support medium comprises magnesium oxide, silicon, aluminium oxide, silicon oxide, aluminosilicates, zeolites, MCM-41 or MC-8.

18. A process as claimed in claim 1, wherein the metallic particles are present in the support medium at about 1-10 wt %.

19. A process as claimed in claim 1, wherein the graphene is removed from the support medium and/or metallic particles by a single dissolution step.

20. A process as claimed in claim 1, further comprising the step of connecting the graphene particles to form a film.

* * * * *